United States Patent [19]
Kita

[11] Patent Number: 4,759,184
[45] Date of Patent: Jul. 26, 1988

[54] ACCELERATION MODULATOR FOR A HYDRAULIC DRIVING SYSTEM

[75] Inventor: Yasuo Kita, Kyoto, Japan
[73] Assignee: Shimadzu Corporation, Japan

[21] Appl. No.: 55,884
[22] Filed: Jun. 1, 1987

[30] Foreign Application Priority Data

Jun. 11, 1986 [JP] Japan ................................ 61-136968

[51] Int. Cl.[4] ................................................ F16D 31/02
[52] U.S. Cl. ........................................ 60/431; 123/396; 123/401; 417/34
[58] Field of Search ............................ 60/431; 417/34; 180/6.48; 123/378, 401, 396

[56] References Cited

U.S. PATENT DOCUMENTS

| | | | |
|---|---|---|---|
| 3,374,745 | 3/1968 | Moffett | 417/34 |
| 3,756,747 | 9/1973 | Caffrey | 417/34 |
| 3,864,059 | 2/1975 | Smith | 417/34 X |
| 3,871,177 | 3/1975 | Ridlen | 60/431 |
| 3,943,712 | 3/1976 | Stuhr | 60/431 X |
| 4,086,823 | 5/1978 | Fatur | 60/431 X |

FOREIGN PATENT DOCUMENTS

| | | | |
|---|---|---|---|
| 159161 | 10/1985 | European Pat. Off. | 60/431 |

*Primary Examiner*—Edward K. Look
*Attorney, Agent, or Firm*—Franklin D. Wolffe; Morris Fidelman

[57] ABSTRACT

An acceleration regulator in the driving system of an automotive vehicle comprising an element for transmitting displacement comprising a first portion and a second portion; a differential mechanism having a first input terminal connected to the first portion of the element, a second input terminal, an an output terminal connected to the second portion of the element, and being so arranged that the amount of operation applied through the first portion of the element to the first input terminal is modulated differentially by the piston of the second input terminal so that the modulated amount of operation is taken out at the output terminal; and a fixing mechanism for variably fixing the position of the second input terminal of the differential mechanism, the fixing mechanism being so arranged that when the hydraulic pressure in the hydraulic circuit of the driving system rises to a preset level slightly lower than the relief pressure of the circuit, the second input terminal of the differential mechanism is moved to a position where the amount of output available at the output terminal of the differential mechanism decreases.

4 Claims, 5 Drawing Sheets

ACCELERATION MODULATOR FOR A HYDRAULIC DRIVING SYSTEM

BACKGROUND OF THE INVENTION

This invention relates to an apparatus for modulating acceleration in the driving system of an automotive vehicle such as an automobile or a tractor provided with a hydraulic transmission.

Generally, a driving system for an automtive vehicle such as a tractor provided with a hydraulic transmission comprises an engine as a prime mover, a hydraulic pump driven by the engine to produce a hydraulic pressure, and a hydraulic motor connected through a hydraulic circuit to the pump so that the motor is driven by the output pressure of the pump to produce a motive force for driving the wheels of the vehicle. Either the pump or the motor or both are of a variable displacement type, so that the transmission ratio may be changed by changing the displacement of either or both of the pump and the motor.

In this system, the output of the engine is controlled by an accelerator provided with a pedal or the like in such a manner that the amount of operation applied to the accelerator pedal is transmitted through a displacement transmitting element such as a wire to the throttle valve of a carburetor for the engine.

Normally, the system of the above type is used in the range in which the output pressure of the hydraulic pump remains lower than the relief pressure of the hydraulic circuit including the pump and the motor. Under the normal condition, the absorption torque is the product of the output pressure of the pump and the displacement thereof.

In a system in which the outupt of the engine can be freely controlled by stepping on the accelerator pedal, it often happens that the output of the engine is increased to such an unnecessarily high level that the pressure in the hydraulic circuit reaches the relief pressure, whereupon the excess hydraulic operating fluid is discharged out of the circuit through a relief valve, with resulting waste of energy and abnormal rise of the temperature of the hydraulic operating fluid. This is a great disadvantage.

The object of the invention is to provide an apparatus for modulating acceleration in the driving system of an automotive vehicle, which completely eliminates the above-mentioned and other disadvantages of the conventional systems.

The invention will be described with reference to the accompanying drawings.

SUMMARY OF THE INVENTION

Figure 1:
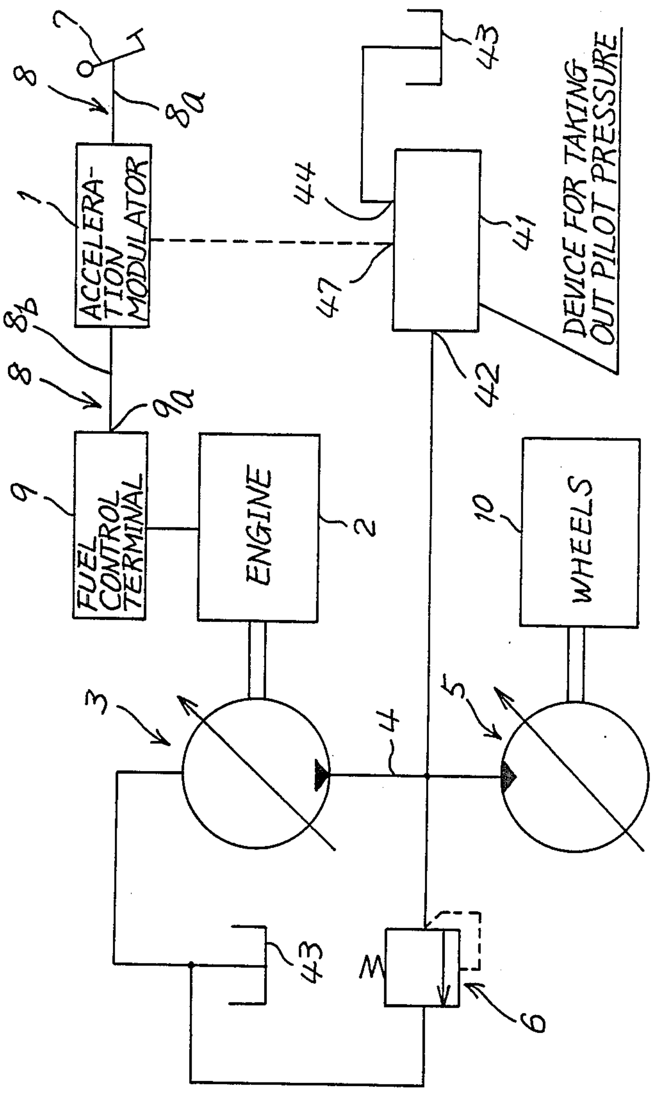
FIG. 1 schematically shows a driving system in which the acceleration modulator of the invention is incorporated.
Figure 2:
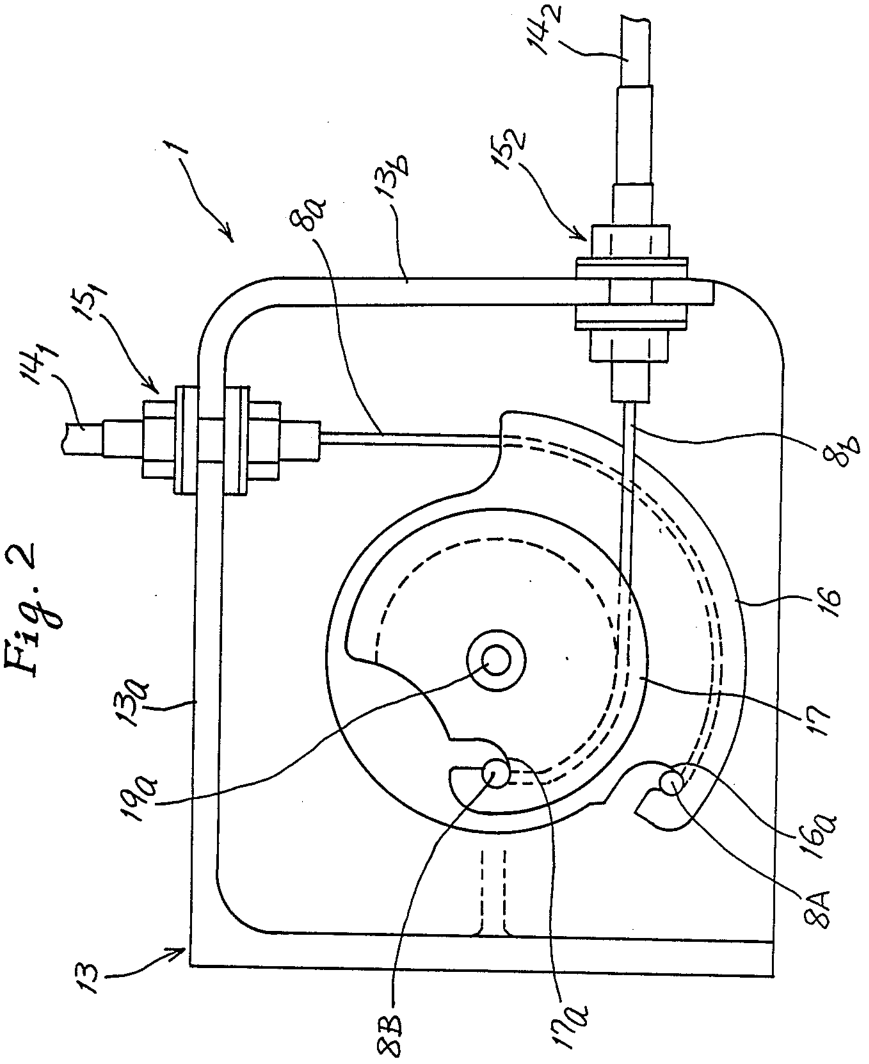
FIG. 2 is a top plan view of the acceleration modulator in the system of FIG. 1.
Figure 3:
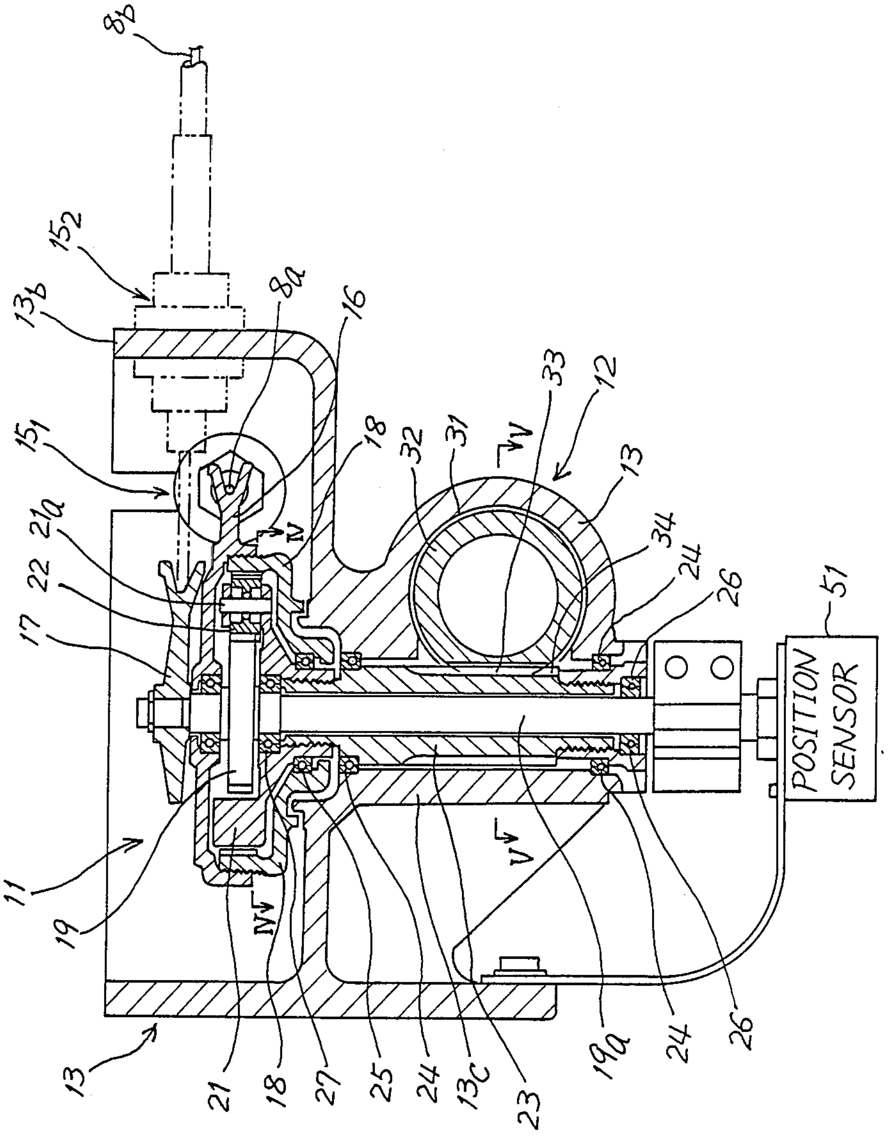
FIG. 3 is a vertical section of the modulator shown in FIG. 2.
Figure 4:
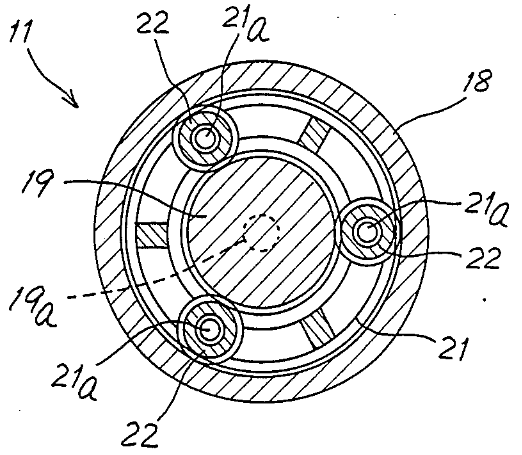
FIG. 4 is a transverse section taken along line IV—IV in FIG. 3.

The acceleration modulator of the invention is incorporated into a hydraulic driving system which comprises a prime mover the output of which varies with the amount of operation applied to the terminal for controlling energy supply to the prime mover, a hydraulic pump driven by the prime mover, a hydraulic motor for driving the wheels of a vehicle, and a hydraulic circuit for connecting the pump and the motor to operate the motor with the output pressure of the pump thereby to drive the vehicle wheels.

Briefly stated, the acceleration regulator of the invention comprises: an element for transmitting displacement comprising a first portion and a second portion; a differential mechanism having a first input terminal connected to the first portion of the element, a second input terminal, and an output terminal connected to the second portion of the elemnet, and being so arranged that the amount of operation applied through the first portion of the element to the first input terminal is modulated differentially by the the position of the second input terminal so that the modulated amount of operation is taken out at the output terminal; and a fixing mechanism for variably fixing the position of the second input terminal of the differential mechanism, the fixing mechanism being so arranged that when the hydraulic pressure in the hydraulic circuit of the driving system rises to a preset level slightly lower than the relief pressure of the circuit, the second input terminal of the differential mechanism is moved to a position where the amount of output available at the output terminal of the differential mechanism decreases.

So long as the hydraulic pressure in the hydraulic circuit remains below the preset level adjacent to the relief pressure of the hydraulic circuit, the fixing mechanism holds the second input terminal of the differential mechanism at a fixed position. Under the condition, the amount of operation applied to the first portion of the displacement transmitting element and transmitted to the first input terminal of the differential mechanism is not changed but taken out at the output terminal of the differential mechanism so as to be transmitted to the control terminal of energy supply to the prime mover. In this case the output of the prime mover can be controlled in substantially the same manner as if there were no differential mechanism interposed between the first and second portions of the displacement transmitting element.

When an excessive amount of operation has been applied to the first portion of the displacement transmitting element so that the output of the prime mover increases thereby to cause the system pressure in the hydraulic circuit to exceed the preset level slightly lower than the relief pressure of the circuit, the fixing mechanism operates in response to the increased system pressure to change the fixed position of the second input terminal of the differential mechanism so as to reduce the amount of displacement to be taken out at the output terminal of the differential mechanism. As a result, as the excessive amount of operation applied to the first portion of the displacement transmitting element is delivered to the control terminal of energy supply to the prime mover, the amount is reduced to such a relatively low level as to prevent unnecessary increase of the output of the prime mover.

DESCRIPTION OF THE PREFERRED EMBODIMENTS

Referring to FIG. 1, there is schematically shown a driving system for an automotive vehicle, into which the acceleration modulator of the invention is incorporated as shown as a mere block 1. The driving system can be employed in a tractor, for example, and comprises an engine 2 as a prime mover, a hydraulic pump 3 driven by the output of the engine 2, a hydraulic motor 5 driven by the output hydraulic pressure of the pump 3, and a hydraulic circuit 4 connecting the pump and the motor. The motor 5 produces an output to drive the wheels of a vehicle shown as a mere block 10.

The pump 3 and the motor 5 are of a variable displacement type, so that the transmission ratios of the driving system can be varied continuously by changing the displacement of either or both of the pump and the motor. The hydraulic circuit 4 is provided with a relief valve 6 to define the upper limit of the system pressure thereby to prevent destruction of the circuit 4. The output of the engine 2 is controlled by the amount of operation on an accelerator pedal 7 transmitted through an element such as a wire 8 for transmitting the displacement of the pedal 7 to a fuel control terminal 9 of the engine 2 such as a throttle valve in a carburetor, not shown, for the engine.

In accordance with the invention, the wire 8 comprises two portions, that is, the forward portion **8*a* connected at one end thereof to the accelerator pedal 7 and the rear portion 8*b* connected at one end thereof to an operating rod 9*a* for controlling the throttle valve 9**.

The acceleration modulator 1 of the present invention is provided between the other end of the forward wire portion **8*a* and the other end of the rear wire portion 8*b*. One form of the modulator 1 is shown in detail in FIGS. 2 through 5, comprising a differential gear mechanism 11 having a first and a second input terminal and an output terminal and so designed as to subtract the amount of operation applied to the second input terminal from the amount of operation applied to the first input terminal and produce an amount of operation corresponding to the result of subtraction at the output terminal, and a mechanism 12 for variably fixing the position of the second input terminal of the differential gear mechanism 11**.

The differential gear mechanism 11 is enclosed in a casing 13, which supports the forward portion **8*a* of the wire 8 by a first lateral wall 13*a* thereof and the rear portion 8*b* of the wire by a second lateral wall 13*b* thereof extending at right angles with the first lateral wall 13*a*. In particular, the forward and rear wire portions 8*a* and 8*b* pass through bearing sleeves $\mathbf{14_1}$ and $\mathbf{14_2}$, respectively, to be slidably supported thereby. The sleeves $\mathbf{14_1}$ and $\mathbf{14_2}$ are mounted on the lateral side walls 13*a* and 13*b* of the casing 13** by means of retainers $\mathbf{15_1}$ and $\mathbf{15_2}$, respectively.

The forward wire portion **8*a* has its rear end 8A engaged with a recess 16*a* formed on the periphery of an input pulley 16 constituting the first input terminal of the differential gear mechanism 11. The rear wire portion 8*b* has its forward end 8B engaged with a recess 17*a* formed on the periphery of an output pulley 17 constituting the output terminal of the differential gear mechanism 11. The wire portions 8*a* and 8*b* run partially about the pulleys 16 and 17**, respectively.

In the illustrated embodiment, the differential gear 11 is of the planetary type comprising a ring gear 18, a sun gear 19 secured to a shaft **19*a* and arranged within the ring gear 18 coaxially therewith, a gear retainer 21 arranged rotatably and coaxially with both the sun gear 19 and the ring gear 18, and a plurality, say, three planetary gears 22 rotatably supported on the gear retainer 21 by means of a pin 21*a* and engaged with both the ring gear 18 and the sun gear 19. The previously mentioned input pulley 16 is mounted on the ring gear 18 for simultaneous rotation therewith, and the previously mentioned output pulley 17 is mounted on the shaft 19*a*** for simultaneous rotation therewith.

The gear retainer 21 has its under side fixed to a hollow cylindrical input shaft 23, which constitutes the second input terminal of the differential gear mechanism 11, for simultaneous rotation therewith. The input shaft 23 is rotatably supported by a pair of radial bearings 24 mounted in a boss **13*c* formed inside the casing 13. The ring gear 18 is mounted by a bearing 25 on the gear retainer 21 fixed to the upper end of the input shaft 23. The support shaft 19*a* of the sun gear 19 is rotatably supported on the input shaft 23 and the gear retainer 21 by means of bearings 26 and 27. The previously mentioned fixing mechanism 12 engages the input shaft 23** so as to fix the shaft at a desired angular position, which can be changed as will be described presently.

Figure 5:
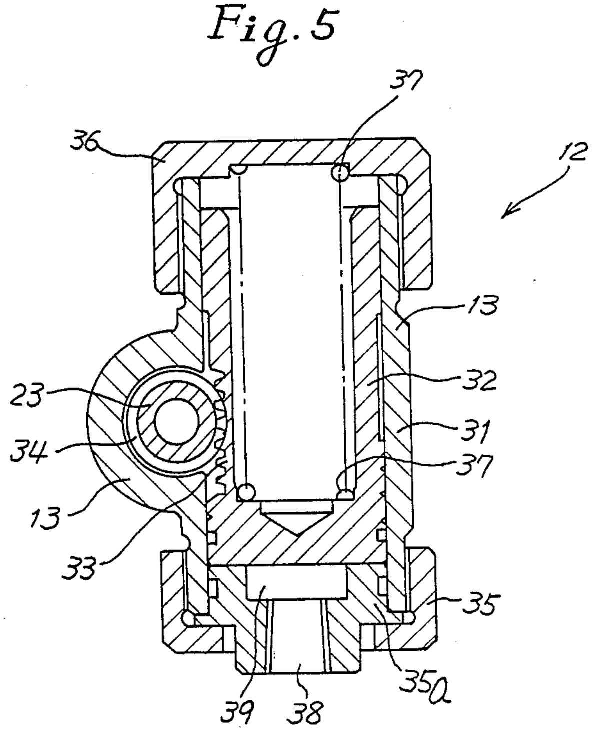
FIG. 5 is a transverse section taken along line V—V in FIG. 3.

As shown in FIG. 5, the fixing mechanism 12 comprises a cylinder 31 formed in the casing 13 in association with the boss **13*c*, and a piston 32 slidably disposed in the chamber of the cylinder 31 so as to be operated by the pilot pressure taken out of the hydraulic pressure circuit 4 as will be described presently. The piston 32 is formed on the exterior surface thereof with a rack 33 extending axially of the piston and engaging a pinion gear 34 formed on the exterior circumferential surface of the input shaft 23**.

In further detail, the cylinder 31 extends perpendicularly to the input shaft 23 and is provided at the opposite ends with a pair of caps 35 and 36 and a plug **35*a* liquid-tightly closing the cylinder chamber as shown in FIG. 5. The piston 32 is a hollow cylindrical member open at one end and closed at the other, with a compression coil spring 37 enclosed therein to normally urge the piston 31 against the inner face of the cylinder plug 35*a*. In the cylinder plug 35*a* there is formed a passage 38 connected to a device 41 for taking out a pilot pressure so that the pilot pressure taken out of the hydraulic circuit 4 is introduced through the passage 38 into a pilot pressure chamber 39 formed in the inner end face of the plug 35*a* defined by the closed end of the piston 32**.

Figure 6:
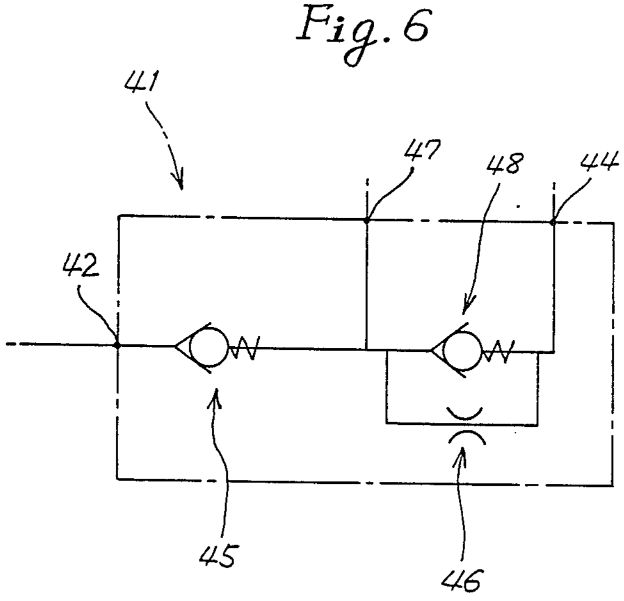
FIG. 6 is a block diagram of the device for taking out the pilot pressure used in the system of FIG. 1.

As schematically shown in FIG. 6, the device 41 for taking out a pilot pressure has an inlet port 42 through which the system pressure in the hydraulic circuit 4 the upper limit of which is defined by the previously mentioned relief valve 6 is introduced into the device 41, an outlet port 44 through which the pressure is discharged into a reservoir tank 43 shown in FIG. 1, a series combination of a first relief valve 45 and a restrictor 46 connected between the inlet and outlet ports 42 and 44, a pilot pressure port 47 connected between the first relief valve 45 and the restrictor 46 for a pilot pressure to be taken out therefrom, and a second relief valve 48 connected in parallel with the restrictor 46 to regulate the pilot pressure to be taken out.

The operating pressure of the first relief valve 45 is set to a level a little lower than that of the relief valve 6 in the hydraulic circuit 4. The pilot pressure port 47 is connected to the passage 38 in the cylinder plug **35*a***.

A sensor 51 detects the opening of the throttle valve 9, that is, converts the rotational angle of the support shaft 19*a* of the sun gear 19 in the previously mentioned differential mechanism 11 to a corresponding electrical signal, which is used for controlling the HST or HMT 2.

The system of the invention operates in the following manner.

So long as the system pressure in the hydraulic circuit 4 remains below the preset pressure level of the device 41 a little lower than the preset pressure of the relief valve 6, no pilot pressure will be supplied from the device 41 to the fixing mechanism 12, so that the spring 37 keeps the piston 32 abutting on the inner face of the cylinder plug 35*a* and consequently the input shaft 23 of the differential mechanism 11 at a predetermined angular position and the planetary gears 22 at predetermined waiting positions. Under the condition, the amount of displacement of the accelerator pedal 7 is transmitted to the input pulley 16 and thence through the ring gear 18, the planetary gears 22, the sun gear 19 and the support shaft 19*a* thereof successively to the output pulley 17 fixed to the upper end of the shaft 19*a*, so that the pulley 17 is rotated in the direction opposite to that of rotation of the input pulley 16 so as to pull the rear portion 8*b* of the accelerator wire 8 thereby to control the opening of the throttle valve 9 in accordance with the amount of operation on the accelerator pedal 7.

If the accelerator pedal 7 has been operated excessively so that the resulting increase in the output of the engine 2 causes the system pressure in the hydraulic circuit 4 to exceed the pressure preset level of the device 41 a little lower than the relief pressure of the relief valve 6 in the circuit 4, the first relief valve 45 in the device 41 is opened to introduce into the pressure chamber 39 of the fixing mechanism 12 a pilot pressure the upper level of which is defined by the opening pressure of the second relief valve 48. The pilot pressure introduced into the chamber 39 urges the piston 32 away from the cylinder plug 35*a* against the force of the spring 37, thereby to cause the input shaft 23 of the differential mechanism 11 engaged by the rack 33 on the piston 32 to rotate about the axis of the input shaft 23 for an angle corresponding to the pilot pressure, whereupon the positions of the planetary gears 22 on the gear retainer 21 change thereby to reduce the output angular displacement of the sun gear 19. This means that the amount of angular displacement of the input shaft 23 of the differential mechanism 11 has been subtracted from the amount of operation on the accelerator pedal 7 transmitted to the input pulley 16, and the resulting reduced amount of displacement is taken out from the output pulley 17 so as to control the opening of the throttle valve 9.

With the apparatus of the invention as described above in detail, even when the accelerator pedal 7 has been excessively operated by mistake, the output of the engine 2 is automatically restricted to prevent the system pressure from reaching the relief pressure level thereby to prevent a large amount of working fluid from being returned to the tank 43 through the relief valve 6, with resulting marked reduction of energy loss and effective prevention of abnormal rise of the temperature of the working fluid.

Since the displacement of the forward portion 8*a* of the wire 8 is transmitted through a gear type differential mechanism, that is, the differential mechanism 11 to the wire rear portion 8*b*, there is scarcely any error, delay or loss in transmission of movement, so that the operator can control the throttle valve 9 as effectively as if there were no acceleration modulator and without deterioration of the feeling of operating the throttle valve.

Advantageously the throttle position sensor 51 is secured to the lower portion of the shaft 19*a* which projects outside the casing 13 as in the illustrated embodiment of the invention, so that the sensor 51 is scarcely affected by the vibration of the engine.

A preferred embodiment of the invention having been described above in detail, the invention is not limited to the illustrated embodiment, but there may be many modifications. For example, it is possible to use other prime movers than the engine to dirve the hydraulic pump. The differential gear mechanism and the element for transmitting displacement are not limited to the illustrated forms.

The acceleration modulator of the invention can be easily incorporated into a driving system and prevent loss of energy and abnormal temperature rise of the working fluid which would otherwise be caused by excessive operation of acceleration of the driving system, and this is possible without damaging the feeling of operation of acceleration. Since the element for transmitting displacement comprises a wire, it enables easy connection to the differential gear and proper and reliable control of acceleration.

What I claim is:

1. A hydraulic driving system having an operating member, a prime mover with an output which varies with the amount of operation of said operating member as transmitted to the fuel control terminal of said prime mover, a hydraulic pump driven by said prime mover, and a hydraulic circuit connected to said hydraulic pump for transmitting the hydraulic pressure output from said hydraulic pump to an object to be driven by said hydraulic pressure; an acceleration modular, comprising:

(a) an element for transmitting an amount of operation of said operating member to said fuel control terminal of said prime mover, wherein said element comprises a first portion and a second portion;

(b) a differential mechanism having a first input terminal connected to said first portion of said element, a second input terminal, an output terminal connected to said second portion of said element, wherein said differential mechanism being so arranged that an amount of operation of said operating member applied through said first portion of said element to said first input terminal is modulated differentially by the position of said second input terminal so that the modulated amount of operation is taken out of said output terminal; and (c) a fixing mechanism operably connected to said second input terminal of said differential mechanism for variably fixing the position of said second input terminal, wherein said fixing mechanism being so arranged that when the hydraulic pressure in said hydraulic circuit of said driving system rises to a preset level slightly lower than the relief pressure of said hydraulic circuit, said second input terminal of said differential mechanism is moved to a position where the amount of output available at said output terminal of said differential mechanism decreases.

2. The device of claim 1, wherein said prime mover is a combustion engine the fuel supply to which is controlled by an accelerator having a fuel control terminal, and said operating member is an acceleration pedal of said accelerator, and said object comprises a hydraulic motor for driving the drive wheels of an automotive vehicle.

3. The device of claim 2, wherein said transmitting element is a wire comprising a first portion and a second portion, and said first input terminal of said differential mechanism comprises a first pulley to which said first wire portion has its one end conencted and about which said first wire portion partially runs in contact therewith, and said output terminal of said differential mechanism comprises a second pulley to which said second wire portion has its one end connected and about which said second wire portion partially runs in contact therewith, said first wire portion having its opposite end connected to said acceleration pedal and said second wire portion having its opposite end connected to said fuel control terminal.

4. In a hydraulic driving system for an automotive vehicle comprising an accelerator having an operating pedal, an engine whose output varies with the amount of operation of said operating pedal, a hydraulic pump driven by said engine, a hydraulic motor for driving the wheels of said automotive vehicle, and a hydraulic circuit for transmitting the hydraulic pressure output from said hydraulic pump to said hydraulic motor so as to cause said motor to drive said wheels, an acceleration modulator comprising:

(a) a casing;

(b) a wire comprising a first portion and a second portion;

(c) a differential gear mechanism comprising:

(c-1) a hollow cylindrical input shaft rotatably supported by a boss formed inside said casing, and having a pinion gear formed on the outer circumferential surface thereof, (c-2) a gear retainer fixed to said input shaft for simultaneous rotation therewith, (c-3) a ring gear rotatably supported by said gear retainer coaxially therewith, (c-4) an input pulley fixed to said ring gear for simultaneous rotation therewith, with said first wire portion having its one end fixed to said input pulley and its opposite end fixed to said accelerator pedal, (c-5) a support shaft extending through said input shaft and rotatably supported by said input shaft and said gear retainer, (c-6) a sun gear arranged coaxially with said ring gear and fixed to said support shaft for simultaneous rotation therewith, (c-7) an output pulley fixed to said support shaft for simultaneous rotation therewith and with said sun gear, with said second wire portion having its one end fixed to said output pulley and its opposite end fixed to the fuel controller of said engine;

(d) a mechanism for variably fixing the angular position of said input shaft comprising:

(d-1) a cylinder chamber formed in said casing adjacent to said boss and extending perpendicularly to said input shaft of said differential gear mechanism, (d-2) a piston slidably disposed in said cylinder chamber and formed on its outer surface with a rack meshing with said pinion gear fromed on said input shaft of said differential gear mechanism, (d-3) a spring disposed in said cylinder chamber to normally keep said piston at a fixed position, (d-4) an inlet port for introducing into said cylinder chamber a pilot pressure to cause said piston to move against the force of said spring thereby to change the angular position of said input shaft; and (e) means for taking out a pilot pressure from said hydraulic circuit, comprising:

(e-1) an inlet port connected to said hydraulic circuit, (e-2) a first relief valve connected at one side to said inlet port and having an operating pressure preset to a level a little lower than the relief pressure of said hydraulic circuit, (e-3) an outlet port connecting the opposite side of said first relief valve to said inlet port (d-4) of said mechanism (d) to introduce the pilot pressure taken out by said first relief valve from said hydraulic circuit into said cylinder chamber (d-1), and (e-4) a second relief valve connected to said opposite side of said first relief valve for defining the upper limit of said pilot pressure taken out by said first relief valve.

* * * * *